UNITED STATES PATENT OFFICE.

FREDERICK M. BECKET, OF NIAGARA FALLS, NEW YORK, ASSIGNOR TO ELECTRO METALLURGICAL COMPANY, OF NEW YORK, N. Y., A CORPORATION OF WEST VIRGINIA.

METHOD OF PREPARING TUNGSTEN AND ALLOYS THEREOF.

1,081,567.  Specification of Letters Patent.  Patented Dec. 16, 1913.

No Drawing.  Application filed October 29, 1912. Serial No. 728,498.

*To all whom it may concern:*

Be it known that I, FREDERICK M. BECKET, a subject of the King of Great Britain, residing at Niagara Falls, in the county of Niagara and State of New York, have invented certain new and useful Improvements in Methods of Preparing Tungsten and Alloys Thereof, of which the following is a specification.

This invention relates to the treatment of ferrotungsten which is high in phosphorus, or in phosphorus and carbon, for the purpose of producing therefrom a metal or alloy comparatively low both in phosphorus and carbon.

According to the invention, ferrotungsten high in phosphorus or in phosphorus and carbon, hereinafter refered to simply as "crude ferrotungsten," is first subjected to an oxidizing roast having for its purpose the oxidation of the metal-content and of the carbon, either wholly or in large degree, whereby there is produced a mixture of oxids of iron and tungsten containing little or no carbon. This oxidizing roast may be performed under any desired conditions, as for example in a rotary kiln at a red heat. In case of ferrotungsten high in tungsten, preliminary grinding to a fine state of subdivision is unnecessary, since the roasted material is friable in character and usually falls apart during the roasting operation.

The roasted product, which may be referred to simply as the "mixed oxids" is then treated by any one of a number of methods having for their purpose the ultimate preparation of a low-phosphorus metal or alloy or of a metal or alloy low both in phosphorus and carbon. The particular method selected for the treatment of the mixed oxids will depend primarily upon the phosphorus-content of the original ferrotungsten, and upon the requirements as to the phosphorus-content of the purified metal or alloy. Typical methods of treating the mixed oxids derived from the ferrotungsten are as follows, it being of course understood that any combination of these methods may be employed to suit particular conditions.

(1) The mixed oxids are smelted in the electric furnace, preferably with silicon in case a final product low in carbon is desired. This procedure may give a final or purified product sufficiently low in phosphorus, even when the original ore contains considerable phosphorus, for the reason that the reduction of phosphorus is not quantitative, whereas the reduction of tungsten and iron is substantially quantitative; from which it follows that repeated smeltings yield products successively lower in phosphorus.

(2) The mixed oxids may be subjected to an acid-treatment for the purpose of removing some of the phosphorus and thereby increasing the ratio of tungsten to phosphorus, the product thus purified being thereafter reduced to the metallic state by any preferred method. The acid-treatment may be performed in the manner described in my copending application Serial No. 727,215, filed October 22, 1912, for example as follows: To the mixed oxids is added concentrated sulfuric acid (specific gravity 184) in the proportion of about 200 cubic centimeters of acid per kilogram of oxids, and the mixture is permitted to stand at room temperatures for a few hours, after which it is thoroughly washed with water. By this treatment a material proportion of the phosphorus, amounting in many cases to 90 per cent. of all phosphorus present in the mixed oxids, is removed. The foregoing treatment yields a very low phosphorus product, even from ores of excessive phosphorus-content. The acid-treatment presents the further advantage of removing a material proportion of the iron, thus leaving a somewhat purer oxid of tungsten, which may be reduced in any desired manner, as for example by gases containing carbon monoxid and hydrogen, such for instance as the gases derived from the commercial furnaces for the manufacture of calcium carbid. Or the product may be reduced in any other suitable manner, as by smelting with silicon in the electric furnace.

(3) The mixed oxids may be subjected to magnetic separation for removal of iron, it being found that a material proportion of iron is present in such oxids in a magnetic condition. The removed iron carries with it a considerable proportion of the phosphorus. The tungsten concentrate from such magnetic separation may be reduced by any of the methods above described; or if desired this concentrate may be subjected to an acid-treatment as above referred to, whereby further proportions of iron and phosphorus are removed, yielding a product which affords on reduction a commercial grade of tungsten metal or high grade alloy.

(4) The mixed oxids obtained by roasting the ferrotungsten are directly reduced by a gaseous reducing agent, as corbon monoxid or hydrogen, or by gaseous mixtures containing these, without substantial fusion of the reduced product. From the resulting reduced product a part of the iron, and with it a material proportion of the phosphorus, is removed by magnetic separation, by acid solution, by a combination of these methods, or by any suitable concentrating process, either chemical or mechanical. The residual commercially pure ferrotungsten in finely-divided form is suitable for use as an addition to steel and for other purposes. Instead of concentrated sulfuric acid, other acids or acid-reacting bodies may be used, as for example diluted sulfuric acid, hydrochloric acid or the like. Mixed reagents may also be used, good results having been obtained with sulfuric acid containing a small proportion of nitric acid, potassium chlorate, and other oxidizing agents. Chlorin and chlorin-yielding mixtures have not proven effective for the purposes of this invention. In the use of these acid baths it may be desirable to dispose the ore in proximity to an insoluble anode connected in a direct electric circuit, for example in proximity to an anode of lead in the case of sulfuric acid, whereby the solvent effect of the acid is somewhat accentuated.

The processes of treating high-carbon ferrotungsten above described may be regarded as portions of a complete process which involves the electric furnace reduction by means of carbon of tungsten ores or concentrates under conditions yielding a high carbon ferrotungsten. Such reduction is efficiently and economically performed by known methods, and the processes described above afford a ready means for converting the high-carbon ferrotungsten into a product which is comparatively low both in carbon and in phosphorus. I believe myself the first to establish the fact it is possible, by a commercial roasting operation, practically to eliminate the carbon from high-carbon ferrotungsten, converting the crude ferrotungsten into a mixture of oxids susceptible of direct treatment for the production of relatively pure metallic products.

I claim:

1. The method of treating crude ferrotungsten, which consists in subjecting the same to an oxidizing roast and thereafter reducing the oxidized product.

2. The method of preparing tungsten or its alloys, which consists in subjecting crude ferrotungsten to an oxidizing roast, concentrating the tungsten-content of the oxidized product, and thereafter reducing said product.

3. The method of treating crude ferrotungsten, which consists in subjecting the same to an oxidizing roast, removing phosphorus from the oxidized product, and thereafter reducing said product.

In testimony whereof I affix my signature in presence of two witnesses.

FREDERICK M. BECKET.

Witnesses:
F. L. SECORD,
D. BURGESS.